(12) United States Patent
Shimizu et al.

(10) Patent No.: US 9,527,981 B2
(45) Date of Patent: Dec. 27, 2016

(54) GRANULATED RESIN ADDITIVE COMPOSITION

(75) Inventors: Tomonori Shimizu, Saitama (JP); Naoko Tanji, Saitama (JP); Atsushi Sakai, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 13/638,461

(22) PCT Filed: Mar. 29, 2011

(86) PCT No.: PCT/JP2011/057911
§ 371 (c)(1),
(2), (4) Date: Sep. 28, 2012

(87) PCT Pub. No.: WO2011/125682
PCT Pub. Date: Oct. 13, 2011

(65) Prior Publication Data
US 2013/0012630 A1 Jan. 10, 2013

(30) Foreign Application Priority Data
Mar. 31, 2010 (JP) .................................. 2010-081722

(51) Int. Cl.
*C08K 5/13* (2006.01)
*C08K 5/098* (2006.01)
*C08K 5/527* (2006.01)

(52) U.S. Cl.
CPC ............... *C08K 5/13* (2013.01); *C08K 5/098* (2013.01); *C08K 5/527* (2013.01)

(58) Field of Classification Search
CPC .... C08K 5/527; C08K 5/098; C08J 3/12–3/16
See application file for complete search history.

(56) References Cited

U.S. PATENT DOCUMENTS

| | | | |
|---|---|---|---|
| 6,184,275 B1 * | 2/2001 | Takahashi et al. | 524/117 |
| 6,787,067 B2 * | 9/2004 | Yukino | C08K 5/09 252/182.23 |
| 7,714,046 B2 | 5/2010 | Ishii et al. | |
| 2003/0125432 A1 | 7/2003 | Yukino et al. | |
| 2003/0236329 A1 | 12/2003 | Kawamoto et al. | |
| 2010/0204374 A1 | 8/2010 | Tanji et al. | |

FOREIGN PATENT DOCUMENTS

| JP | 5-179056 A | 7/1993 |
|---|---|---|
| JP | 6-91152 A | 4/1994 |
| JP | 9-157437 A | 6/1997 |
| JP | 2001-123021 A | 5/2001 |
| JP | 2002-332383 A | 11/2002 |
| JP | 2003-313444 A | 11/2003 |
| JP | 2004-83852 A | 3/2004 |
| JP | 2004292710 A * | 10/2004 |
| JP | 2005-162867 A | 6/2005 |
| JP | 2008-231143 A | 10/2008 |
| JP | 2009-62417 A | 3/2009 |
| WO | WO 2007/039997 A1 | 4/2007 |

OTHER PUBLICATIONS

Machine Translation of JP 2001-123021 A.*
LookChem. http://adke.lookchem.com/About.html. As viewed on Oct. 13, 2015.*
Machine Translation of JP2004-292710A. Oct. 21, 2004.*
International Search Report issued in PCT/JP2011/057911, dated Apr. 26, 2011.

\* cited by examiner

*Primary Examiner* — Robert C Boyle
*Assistant Examiner* — Stephen Rieth
(74) *Attorney, Agent, or Firm* — Birch, Stewart, Kolasch & Birch, LLP

(57) ABSTRACT

The present invention provides a granulated resin additive composition which comprises an aromatic metal phosphate salt and a phenolic antioxidant and, when blended in a resin, allows the resulting resin composition to have excellent mechanical strengths and transparency. The granulated resin additive composition is characterized by comprising a phosphate salt compound represented by the Formula (I), a phenolic antioxidant and a fatty acid calcium salt, in which granulated resin additive composition the content of the fatty acid calcium salt is 1 to 6 parts by mass with respect to 100 parts by mass of the granulated resin additive composition.

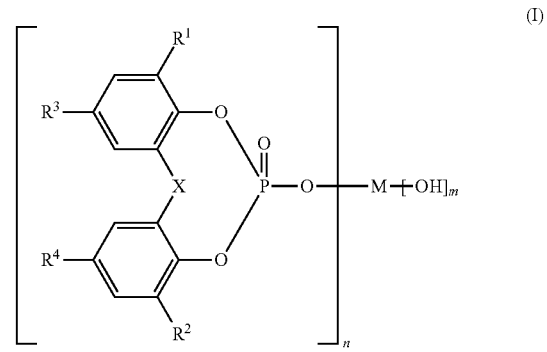

(I)

5 Claims, No Drawings

GRANULATED RESIN ADDITIVE COMPOSITION

TECHNICAL FIELD

The present invention relates to a granulated resin additive composition. More particularly, the present invention relates to a granulated resin additive composition which, when added to a resin, can improve the physical properties of the resulting resin.

BACKGROUND ART

Synthetic resins such as polyolefin have problems in that, for example, when used by themselves, they are rapidly degraded by heat and ultraviolet light during processing and use and thus do not withstand use. Therefore, such synthetic resins are blended with a variety of additives such as an antioxidant, a UV absorber, a hindered amine compound, a nucleating agent, a flame retardant and an antistatic agent.

Conventionally, these additives are added in the form of powder having excellent dispersibility in a resin; however, with consideration for product contamination caused by dust and worker's health, granulation and masterbatching of such additives have been demanded. For example, there have been proposed granulation methods in Patent Documents 1 and 2 and masterbatching methods in Patent Documents 3 and 4.

Masterbatching is an excellent anti-dust measure; however, the thermal history of the resin used becomes extended and the physical properties of the resulting final product are likely to be affected depending on the resin used. In particular, since an additive having poor compatibility with a resin cannot be masterhatched at a high concentration, there is a problem that the ratio of the resin used for the masterbatching contained in a final product becomes high, so that the design of the product composition is constrained. On the other hand, granulation products contain no or only a small amount of a resin component; therefore, they are superior in that arbitrary composition and physical properties of a final product can be easily set.

There are also granulation methods which utilize a binder; however, since a binder affects the resin physical properties, granulation is preferably performed with the required additive(s) alone. Meanwhile, phenolic antioxidants having a melting point of not higher than 200° C. are widely used because, when they are melted and allowed to function as a binder, other high-melting-point additives can be granulated.

RELATED ART DOCUMENTS

Patent Documents

Patent Document 1: Japanese Unexamined Patent Application Publication No. H05-179056
Patent Document 2: Japanese Unexamined Patent Application Publication No. H06-091152
Patent Document 3: Japanese Unexamined Patent Application Publication No. H09-157437
Patent Document 4: Japanese Unexamined Patent Application Publication No. 2009-062417

SUMMARY OF THE INVENTION

Problems to be Solved by the Invention

However, there are problems that, when it is tried to mix and granulate an aromatic metal phosphate salt, which exhibits effects of improving the mechanical strengths and transparency of a resin composition and is used as a nucleating agent, along with a phenolic antioxidant, granulation may present difficulties due to poor lubricity and that the moldability is deteriorated when the resulting granules are added to a resin, so that the mechanical strengths such as flexural modulus are impaired.

Further, in order to impart lubricity, a metallic soap such as calcium stearate is usually used in an additive composition for polyolefin-based resins; however, this has a drawback in that, when an aromatic metal phosphate salt is granulated with a required amount of calcium stearate in a resin composition, the performance thereof is markedly degraded, so that the effects of improving the transparency and mechanical strengths cannot be attained. Thus, such combination of an aromatic metal phosphate salt and calcium stearate is not suitable for granulation.

Therefore, an object of the present invention is to provide a granulated resin additive composition which comprises an aromatic metal phosphate salt and a phenolic antioxidant and, when blended in a resin, allows the resulting resin composition to have excellent mechanical strengths and transparency.

Means for Solving the Problems

In order to solve the above-described problems, the present inventors intensively studied to discover that the above-described problems can be solved by blending a specific amount of fatty acid calcium when granulating a phosphate salt compound and a phenolic antioxidant, thereby completing the present invention.

That is, the granulated resin additive composition according to the present invention comprises a phosphate salt compound represented by the Formula (I):

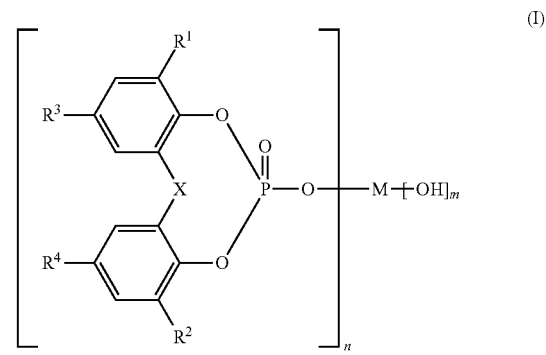

(wherein, $R^1$, $R^2$, $R^3$ and $R^4$ each independently represent a hydrogen atom or a $C_1$ to $C_8$ alkyl group which is optionally branched; X represents a direct bond or a $C_1$ to $C_4$ alkylidene group; M represents an alkali metal, an alkaline earth metal or aluminum; n represents 1 when M is an alkali metal, 2 when M is an alkaline earth metal, and 2 or 3 when M is aluminum; and m represents 0 when M is an alkali metal or an alkaline earth metal, 1 when M is aluminum and n is 2, and 0 when n is 3), a phenolic antioxidant and a fatty acid calcium salt, in which granulated resin additive composition the content of the fatty acid calcium salt is 1 to 6 parts by mass with respect to 100 parts by mass of the granulated resin additive composition.

In the granulated resin additive composition according to the present invention, it is preferred that, in the above-described Formula (I), $R^1$, $R^2$, $R^3$ and $R^4$ be each a tert-butyl group, X be a methylene group and M be an alkali metal.

Further, it is preferred that the granulated resin additive composition according to the present invention contain, with respect to 100 parts by mass thereof, 20 to 80 parts by mass of the phosphate salt compound represented by the above-described Formula (I) and 20 to 80 parts by mass of the above-described phenolic antioxidant.

Further, the granulated resin additive composition according to the present invention can be suitably used in a polyolefin-based resin.

The method of adding a resin additive composition to a resin according to the present invention is characterized in that a resin additive composition which comprises a phosphate salt compound represented by the Formula (I):

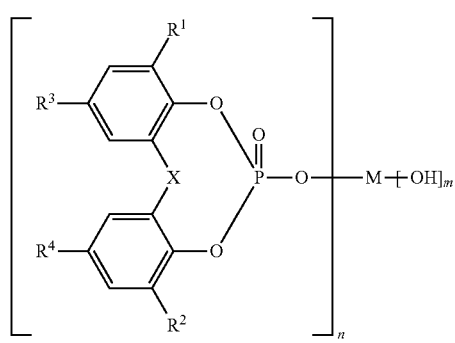

(I)

(wherein, $R^1$, $R^2$, $R^3$ and $R^4$ each independently represent a hydrogen atom or a $C_1$ to $C_8$ alkyl group which is optionally branched; X represents a direct bond or a $C_1$ to $C_4$ alkylidene group; M represents an alkali metal, an alkaline earth metal or aluminum; n represents 1 when M is an alkali metal, 2 when M is an alkaline earth metal, and 2 or 3 when M is aluminum; and m represents 0 when M is an alkali metal or an alkaline earth metal, 1 when M is aluminum and n is 2, and 0 when n is 3), a phenolic antioxidant and a fatty acid calcium salt is made into granules containing 1 to 6 parts by mass of the fatty acid calcium salt with respect to 100 parts by mass of the resin additive composition and then added to a resin.

Effects of the Invention

By the present invention, a granulated resin additive composition which, when blended in a resin, allows the resulting resin composition to have excellent mechanical strengths and transparency can be provided.

Mode for Carrying out the Invention $R^1$, $R^2$, $R^3$ and $R^4$ in the Formula (I) used in the present invention each independently represent a hydrogen atom or a $C_1$ to $C_8$ alkyl group which is optionally branched.

Examples of the $C_1$ to $C_8$ alkyl group which is optionally branched include methyl, ethyl, propyl, isopropyl, butyl, sec-butyl, tert-butyl, pentyl, tert-pentyl, hexyl, heptyl, octyl, 2-ethylhexyl and tert-octyl. $R^1$, $R^2$, $R^3$ and $R^4$ are optionally the same or different; however, it is preferred that they represent the same substituent.

Examples of the $C_1$ to $C_4$ alkylidene group, which is represented by X in the Formula (I) used in the present invention, include methylene, ethylidene, 2,2-propylidene and 1,1-butylidene.

Specific examples of the alkali metal, which is represented by M in the Formula (I) used in the present invention, include lithium, sodium and potassium. Thereamong, sodium is preferred.

Specific examples of the alkaline earth metal, which is represented by M in the Formula (I) used in the present invention, include beryllium, magnesium, calcium and barium.

More specific examples of the metal phosphate salt represented by the Formula (I) include the following Compound Nos. 1 to 4.

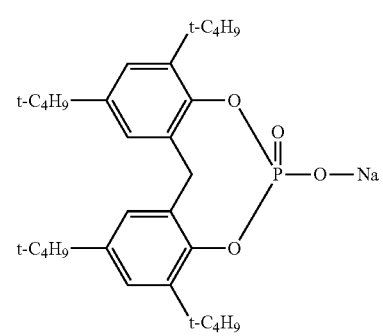

Compound No. 1

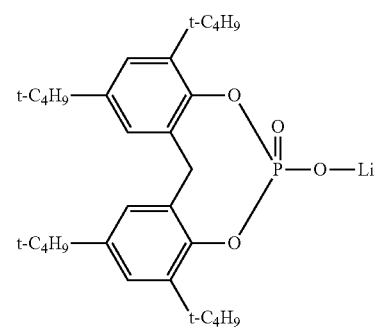

Compound No. 2

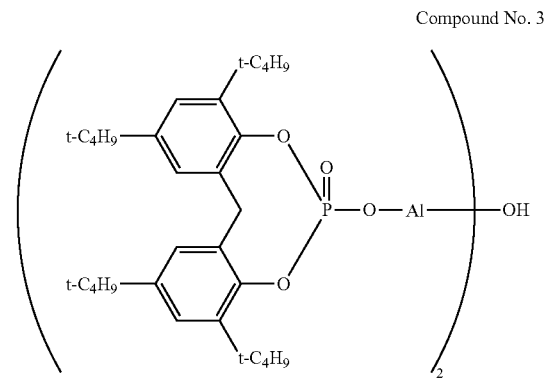

Compound No. 3

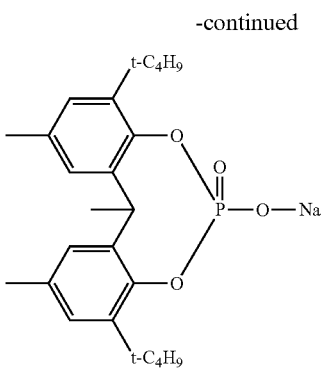

Compound No. 4

Examples of the phenolic antioxidant used in the present invention include 2,6-di-tert-butyl-p-cresol, 2,6-diphenyl-4-octadecyloxyphenol, 2-methyl-4,6-bis(octylthiomethyl)phenol, distearyl(3,5-di-tert-butyl-4-hydroxybenzyl)phosphonate, 1,6-hexamethylenebis[(3,5-di-tert-butyl-4-hydroxyphenyl)propionic acid amide], 4,4'-thiobis(6-tert-butyl-m-cresol), 2,2'-methylenebis(4-methyl-6-tert-butylphenol), 2,2'-methylenebis(4-ethyl-6-tert-butylphenol), 4,4'-butylidenebis(6-tert-butyl-m-cresol), 2,2'-ethylidenebis(4,6-di-tert-butylphenol), 2,2'-ethylidenebis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl)phenol, stearyl(3,5-di-tert-butyl-4-hydroxyphenyl) propionate, thiodiethylene glycol-bis[(3,5-di-tert-butyl-4-hydroxyphenyl)propionate], 1,6-hexamethylenebis[(3,5-di-tert-butyl-4-hydroxyphenyl)propionate], bis[3,3-bis(4-hydroxy-3-tert-butylphenyl)butylic acid]glycol ester, bis[2-tert-butyl-4-methyl-6-(2-hydroxy-3-tert-butyl-5-methylbenzyl)phenyl]terephthalate, 1,3,5-tris[(3,5-di-tert-butyl-4-hydroxyphenyl)propionyloxyethyl]isocyanurate, tetrakis[3-(3,5-di-tert-butyl-4-hydroxyphenyl)propionic acid methyl]methane, 3,9-bis[1,1-dimethyl-2-{(3-tert-butyl-4-hydroxy-5-methylphenyl)propionyl oxy}ethyl]-2,4,8,10-tetraoxaspiro[5.5]undecane and triethylene glycol-bis[(3-tert-butyl-4-hydroxy-5-methylphenyl)propionate]. Tetrakis{3(3,5-di-tert-butyl-4-hydroxyphenyl)propionyloxymethyl}methane is particularly preferred since it has a reasonably high melting point and excellent synthetic resin-stabilizing effect.

The above-described phenolic antioxidants can be used without any particular restriction on, for example, the production conditions such as their intermediates as well as reaction solvent, catalyst, reaction temperature and crystallization method; crystal form; melting point; content of impurities such as by-products and remaining catalyst and solvent; infrared absorption spectrum; and X-ray diffraction peak.

As the above-described fatty acid calcium salt, a known one can be used without any particular restriction. Examples thereof include calcium undecylate, calcium laurate, calcium tridecylate, calcium dodecylate, calcium myristate, calcium palmitate, calcium pentadecylate, calcium stearate, calcium behenate, calcium heptadecylate, calcium arachinate, calcium montanate, calcium oleate, calcium linoleate, calcium arachidonate and calcium behenate. Among the above-described fatty acid calcium salts, calcium stearate is preferred.

In the production of the granulated resin additive composition according to the present invention, the mixing conditions such as mixing apparatus and temperature are not particularly restricted and after mixing resin additives using a variety of mixing apparatuses such as a Henschel mixer, the resultant can be granulated using a roller compactor, a disk pelleter, an extruder or other granulation apparatus.

The granulated resin additive composition according to the present invention may also be granulated in a composition containing, as required, general-purpose resin additives such as a phosphorus-based antioxidant, a sulfur-based antioxidant, a UV absorber, a hindered amine compound, other nucleating agent, an antistatic agent, a heavy metal inactivator, a hydrotalcite, an infrared absorber, an anti-clouding agent, an anti-fogging agent, a filler and an antibacterial/antifungal agent. However, the total amount of the phosphate salt compound represented by the Formula (I) and the phenolic antioxidant is preferably not less than 50% by mass, more preferably not less than 80% by mass of the resulting granules. When the amount of other components is high, the effects of the phosphate salt compound to improve the transparency and physical strength may be impaired, and when the phosphate salt compound is blended in such an amount that a desired transparency is attained, the amount of other components is increased to or beyond a required level, not only resulting in an increased cost but also causing troubles such as bleeding.

The granulated resin additive composition according to the present invention is particularly effective in improving the transparency of a polyolefin-based resin, particularly a polypropylene-based resin, and can be suitably used as a resin additive composition for a polyolefin-based resin. Examples of the polypropylene-based resin include propylene homopolymers, ethylene-propylene random copolymers, ethylene-propylene block copolymers, copolymers of propylene and a small amount (1 to 10% by mass) of other α-olefin (such as 1-butene, 1-hexene or 4-methyl-1-pentene), and copolymers of propylene and ethylenepropylene (TPO).

Polyolefin-based resins such as the above-described polypropylene-based resins can be used regardless of the type and presence/absence of a polymerization catalyst and co-catalyst; stereoregularity; average molecular weight; molecular weight distribution; presence/absence and ratio of a component having a specific molecular weight; specific gravity; viscosity; solubility to various solvents; elongation rate; impact strength; crystallization degree; X-ray diffraction; and presence/absence of denaturation and/or cross-linking treatment performed with an unsaturated carboxylic acid (such as maleic acid, itaconic acid or fumaric acid) and a derivative (such as maleic anhydride, maleic acid monoester or maleic acid diester) or organic peroxide thereof or by irradiation of energy radiation or a combination of these treatments.

To the polyolefin-based resin composition to which the granulated resin additive composition according to the present invention is blended, it is preferred that general-purpose resin additives, such as a phosphorus-based antioxidant, a sulfur-based antioxidant, a UV absorber, a hindered amine compound, a flame retardant, a flame-retardant aid, other nucleating agent, an antistatic agent, a heavy metal inactivator, a plasticizer, a softening agent, a lubricant, a hydrotalcite, a fatty acid metal salt, a pigment, an infrared absorber, an anti-clouding agent, an anti-fogging agent, a filler and an antibacterial/antifungal agent, be added separately in accordance with the use conditions and demanded characteristics. These additives may also be separately granulated and then added to a resin.

In particular, with regard to the above-described fatty acid metal salt, since the content thereof in the granulated resin additive composition according to the present invention is small at not higher than 6 parts by mass with respect to 100 parts by mass of the composition, when the granulated resin additive composition is added to a resin, the catalyst residue may become inactivated and the lubricity and the like of the resulting resin at the time of molding may be insufficient. Therefore, in such a case, it is preferred that the fatty acid metal salt be separately granulated and then added to a resin. By separately granulating and then adding the fatty acid metal salt, a granulated resin additive composition which provides a perfect anti-dust measure for the additives and can have excellent transparency as well as excellent physical strength can be obtained.

The reason why it is preferred to separately granulate and then add the fatty acid metal salt to a resin is not necessarily clear; however, it is speculated as follows. In cases where the content of the fatty acid calcium salt in the granulated resin additive composition according to the present invention is excessively high, the phosphate salt compound represented by the above-describe Formula (I) takes such a mode to be incorporated by the fatty acid calcium salt, so that when blended to a resin, the transparency- and resin strength-improving effects are retarded. In contrast to this, in cases where a fatty acid metal salt is granulated separately from the granulated resin additive composition according to the present invention and then blended to a resin, the above-described incorporation by the fatty acid metal salt does not occur, so that the effects of the addition of the above-described phosphate salt compound are not largely retarded.

Examples of the phosphorus-based antioxidant include trisnonylphenyl phosphite, tris(2,4-di-tert-butylphenyl) phosphite, tris [2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl) isopropylidene diphenol diphosphite, tetra(tridecyl)-4,4'-n-butylidenebis(2-tert-butyl-5-methylphenoediphosphite, hexa(tridecyl)-1,1,3-tris(2-methyl-4-hydroxy-5-tert-butylphenyl)butane triphosphite, tetrakis(2,4-di-tert-butylphenyl) biphenylene diphosphonite, 9,10-dihydro-9-oxa-10-phosphaphenanthrene-10-oxide, 2,2'-methylenebis(4,6-tert-butylphenyl)-2-ethylhexyl phosphite, 2,2'-methylenebis(4,6-tert-butylphenye-octadecyl phosphite, 2,2'-ethylidenebis (4,6-di-tert-butylphenyl)fluorophosphite, tris(2-[(2,4,8,10-tetrakis-tert-butyldibenzo[df][1,3,2]dioxaphosphepine-6-yl) oxy]ethyl)amine and phosphites of 2-ethyl-2-butylpropylcne glycol and 2,4,6-tri-tert-butylphenol.

Examples of the sulfur-based antioxidant include dilauryl thiodipropionate, dimyristyl thiodipropionate, dipalmityl thiodipropionate, distearyl thiodipropionate, tetrakis(3-lauryl thiodipropionic acid methyl)methane, bis(2-methyl-4-(alkyl($C_8$ to $C_{18}$ individual or mixed)thiopropionyloxy)-5-tert-butylphenyl)sulfide, 2-mercaptobenzimidazole, and zinc salt threof.

Examples of the UV absorber include 2-hydroxybenzophenones such as 2,4-dihydroxybenzophenone, 2-hydroxy-4-methoxybenzophenone, 2-hydroxy-4-octoxybenzophenone and 5,5'-methylenebis(2-hydroxy-4-methoxybenzophenone); 2-(2'-hydroxyphenyl) benzotriazoles such as 2-(2'-hydroxy-5'-methylphenyl) benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyebenzotriazole, 2-(2'-hydroxy-3',5'-dicumylphenyl)benzotriazole, 2,2'-methylenebis(4-tert-octyl-6-benzotriazolyl)phenol and 2-(2'-hydroxy-3'-tert-butyl-5'-carboxyphenyl)benzotriazole; benzoates such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate and hexadecyl-3,5-di-tert-butyl-4-hydroxybenzoate; substituted oxanilides such as 2-ethyl-2'-ethoxyoxanilide and 2-ethoxy-4'-dodecyloxanilide; cyanoacrylates such as ethyl-α-cyano-β,β-diphenyl acrylate and methyl-2-cyano-3-methyl-3-(p-methoxyphenyl)acrylate; and triaryl triazines such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine and 2-(2-hydroxy-4-propoxy-5-methylphenyl)-4,6-bis(2,4-di-tert-butylphenyl)-s-triazine.

Examples of the hindered amine compound include 2,2, 6,6-tetramethyl-4-piperidyl stearate, 1,2,2,6,6-pentamethyl-4-piperidyl stearate, 2,2,6,6-tetramethyl-4-piperidylbenzoate, bis(2,2,6,6-tetramethyl-4-piperidyl)sebacate, bis(1,2,2, 6,6-pentamethyl-4-piperidyl)sebacate, bis(1-undecyloxy-2, 2,6,6-tetramethyl-4-piperidyl)carbonate, tetrakis(2,2,6,6-tetramethyl-4-piperidyl)butane tetracarboxylate, tetrakis(1, 2,2,6,6-pentamethyl-4-piperidyl)butane tetracarboxylate, bis(2,2,6,6-tetramethyl-4-piperidyl).di(tridecyl)-1,2,3,4-butane tetracarboxylate, bis(1,2,2,6,6-pentamethyl-4-piperidyl).di(tridecyl)-1,2,3,4-butane tetracarboxylate, bis(1,2,2, 6,6-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6, 6-tetramethyl-4-piperidyl)amino)-s-triazine-6-yl]-1,5,8,12-tetraazadodecane, 1,5,8,12-tetrakis[2,4-bis(N-butyl-N-(1,2, 2,6,6-pentamethyl-4-piperidyl)amino)-s-triazine-6-yl]-1,5, 8,12-tetraazadodecane, 1,6,11-tris[2,4-bis(N-butyl-N-(2,2,6, 6-tetramethyl-4-piperidyl)amino)-s-triazine-6-yl] aminoundecane and 1,6,11-tris[2,4-bis(N-butyl-N-(1,2,2,6, 6-pentamethyl-4-piperidyl)amino)-s-triazine-6-yl] aminoundecane.

As the flame retardant, a halogen-based flame retardant such as decabromodiphenyl ether or tetrabromobisphenol A; a condensed phosphate of a polyhydric phenol, such as triphenyl phosphite, resorcinol or bisphenol A, and a monohydric phenol such as phenol or 2,6-xylenol; an inorganic phosphorus compound such as red phosphorus or melamine phosphate; a nitrogen-containing flame retardant such as melamine cyanurate; an inorganic flame retardant such as magnesium hydroxide or aluminum hydroxide; a flame retardant aid such as antimony oxide or zirconium oxide; or an anti-dripping agent such as polytetrafluoroethylene is employed.

Examples of the flame retardant aid include fluorine resins, such as polytetrafluoroethylenes (PTFE), polyvinylidene fluorides (PVDF), polyvinyl fluorides (PVF), poly-tetrafluoroethylene-hexafluoropropylene copolymers (FEP) and (meth)acryl-modified PTFEs, and silicon resins.

Examples of other nucleating agent include metal salts of benzoic acids such as sodium benzoate, aluminum-p-tert-butyl benzoate and lithium-p-tert-butyl benzoate; metal phosphates such as sodium 2,2-methylenebis(4,6-di-tert-butylphenyl)phosphate; other benzylidene sorbitols such as dibenzylidene sorbitol, bis(4-methylbenzylidene)sorbitol and bis(4-ethylbenzylidene)sorbitol; metal alcoholates such as zinc glycerine; amino acid metal salts such as zinc glutamate; aliphatic dibasic acids having a bicyclo structure, such as bicycloheptane dicarboxylic acid and salts thereof, and metal salts of such aliphatic dibasic acids; metal aromatic sulfonates such as sodium benzenesulfonate and lithium p-toluenesulfonate. It is preferred to use a nucleating agent which, as in the case of a metal salt-based compound such as metal phosphate (e.g. sodium 2,2-methylenebis(4,6-di-tert-butylphenyl)phosphate), improves not only the transparency but also the glass transition temperature of synthetic resins such as polyolefin-based resins, since effects that are not attained solely by the present invention can be expected.

Examples of the heavy metal inactivator include 2-hydroxybenzamide-N-1H-1,2,4-triazole-3-yl and dodecanedioic acid bis[2-(2-hydroxybenzoyl)hydrazide].

As the above-described hydrotalcite compound, a double salt compound represented by the following Formula (II), which is composed of magnesium and aluminum or magnesium and aluminum, is preferably employed, and the hydrotalcite compound may also be one in which crystal water is removed.

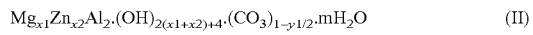

$$Mg_{x1}Zn_{x2}Al_2.(OH)_{2(x1+x2)+4}.(CO_3)_{1-y1/2}.mH_2O \quad (II)$$

(wherein, x1, x2 and y1 each represent a number satisfying the conditions shown by the following equations and m represents 0 or an arbitrary integer:

$0 \leq x2/x1 \leq 10$, $2 \leq x1+x2 < 20$, $0 \leq y1 \leq 2$)

The above-described hydrotalcite compound may be either a naturally-occurring one or a synthetic product. Examples of the method of synthesizing the synthetic product include those known synthesis methods that are disclosed in, for example, Japanese Patent Publication No. S46-2280, Japanese Patent Publication No. S50-30039, Japanese Patent Publication No. S51-29129, Japanese Patent Publication No. H3-36839, Japanese Unexamined Patent Application Publication No. S61-174270, Japanese Unexamined Patent Application Publication No. 2001-164042 and Japanese Unexamined Patent Application Publication No. 2002-53722. Further, in the present invention, the above-described hydrotalcite compound can be used without any restriction on its crystal structure, crystal particle diameter and the like. In addition, the residual amount of heavy metal components such as iron contained in the starting material is preferably small within the range where the purification cost is practical.

Further, as the above-described hydrotalcite compound, one whose surface is coated with, for example, a higher fatty acid such as stearic acid, a higher fatty acid metal salt such as alkali metal oleate, a metal organic sulfonate such as alkali metal dodecylbenzenesulfonate, a higher fatty acid amide, a higher fatty acid ester or a wax can also be employed.

The method of blending the granulated resin additive composition according to the present invention into a resin such as a polyolefin resin, the method of molding the resulting resin composition and the application thereof are not particularly restricted. The resulting resin composition is made into a film, a sheet, a molded article or the like using a known mold-processing technique such as extrusion molding, injection molding, blowing, calendering, press molding or vacuum molding to be used in interior and exterior materials of automobiles, home electric appliances, building materials, packaging materials, agricultural materials, miscellaneous goods, medical instruments and the like. As for the use mode, the resulting resin composition can be used individually or laminated with other resin, metal or the like directly or via an adhesive layer.

The method of adding a resin additive composition to a resin according to the present invention is characterized in that a resin additive composition which comprises a phosphate salt compound represented by the Formula (I):

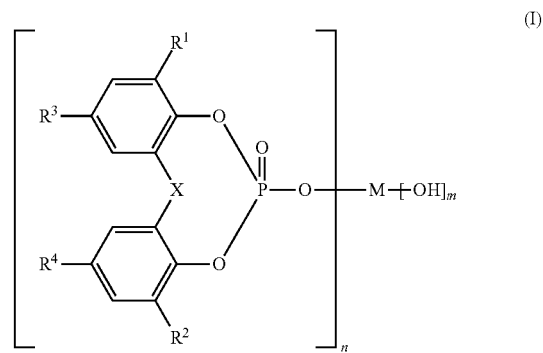

(wherein, $R^1$, $R^2$, $R^3$ and $R^4$ each independently represent a hydrogen atom or a $C_1$ to $C_8$ alkyl group which is optionally branched; X represents a direct bond or a $C_1$ to $C_4$ alkylidene group; M represents an alkali metal, an alkaline earth metal or aluminum; n represents 1 when M is an alkali metal, 2 when M is an alkaline earth metal, and 2 or 3 when M is aluminum; and m represents 0 when M is an alkali metal or an alkaline earth metal, 1 when M is aluminum and n is 2, and 0 when n is 3), a phenolic antioxidant and a fatty acid calcium salt is made into granules containing 1 to 6 parts by mass of the fatty acid calcium salt with respect to 100 parts by mass of the resin additive composition and then added to a resin. As the phosphate salt compound, phenolic antioxidant and fatty acid calcium salt, the above-described ones can be employed.

EXAMPLES

Compound No. 1, tetrakis{3(3,5-di-tert-butyl-4-hydroxyphenyl)propionyloxymethyl}methane and calcium stearate were mixed for 3 minutes using a Henschel mixer in accordance with the formulations shown in Table 1 below and the resultants were each granulated at 130° C. using a biaxial extruder (PCM-30 manufactured by Ikegai Corp). It is noted here that the formulations of Table 1 represent parts by mass.

To 100 parts by mass of a homopolypropylene (MA3: manufactured by Japan Polypropylene Corporation: melt flow index=8 to 10 g/10 min), the thus obtained granules of Examples and Comparative Examples shown in Table 1 were each added in an amount of 0.5 parts by mass. The resultants were each extruded at 230° C. using a biaxial extruder (PCM-30 manufactured by Ikegai Corp) into a pellet, which was then molded at 240° C. As mechanical strength, the flexural modulus was measured in accordance with JIS K7171 using a bending tester AG-IS manufactured by Shimadzu Corporation and as transparency, the haze value was measured in accordance with JIS K7361-1 using Haze-Gard 2 manufactured by Toyo Seiki Seisaku-Sho, Ltd. The results are shown in Table 1.

As Comparative Example 5, a polypropylene resin composition, which was formulated in the form of powder without granulation to have the same composition as Example 1, was evaluated for the flexural strength and haze value.

TABLE 1

| | | Example 1 | Example 2 | Comparative Example 1 | Comparative Example 2 | Comparative Example 3 | Comparative Example 4 | Comparative Example 5 |
|---|---|---|---|---|---|---|---|---|
| Composition | Phosphate salt*1 | 40 | 40 | 40 | 40 | 40 | 40 | 40 |
| | Phenol*2 | 58 | 55 | 60 | 50 | 40 | 58 | 58 |
| | Ca-St*3 | 2 | 5 | 0 | 10 | 20 | 10 | 2 |
| Resin physical properties | Flexural modulus (MPa) | 1900 | 1930 | 1870 | 1850 | 1800 | 1860 | 1880 |
| | Haze value (%) | 40.3 | 42.4 | 39.8 | 52.2 | 57.4 | 51.5 | 41.1 |

*1Compound No. 1 (ADEKA STAB NA-11: manufactured by ADEKA Corporation)
*2tetrakis{3(3,5-di-tert-butyl-4-hydroxyphenyl)propionyloxymethyl}methane (ADEKA STAB AO-60: manufactured by ADEKA Corporation)
*3calcium stearate From the comparisons between Examples 1 and 2 and Comparative Examples 2 to 4, it was able to confirm that a polypropylene composition having excellent flexural strength can be obtained by controlling the amount of calcium stearate blended at the time of granulation in the range of 1 to 6 parts by mass with respect to 100 parts by mass of the granulated resin additive composition. Further, from the comparison between Example 1 and Comparative Example 5, it was revealed that superior performance can be attained by blending calcium stearate upon granulation than simply adding a small amount thereof to polypropylene.

As described in the above, it is apparent that specific effects are exhibited when the fatty acid calcium salt of the present invention is blended in the range of 1 to 6 parts by mass with respect to 100 parts by mass of the granulated resin additive composition.

The invention claimed is:

1. A granulated resin additive composition, consisting essentially of a phosphate salt compound, represented by the Formula (Compound No. 1):

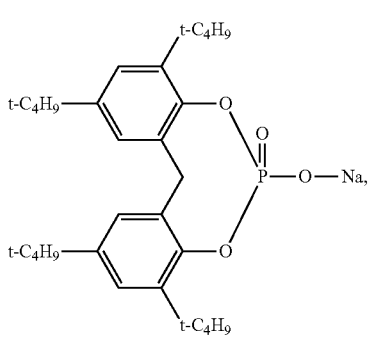

(Compound No. 1)

a phenolic antioxidant,
wherein the phenolic antioxidant is tetrakis {3(3, 5-di-tert-butyl-4-hydroxyphenyl)propionyloxymethyl} methane,
and a fatty acid calcium salt,
wherein the total amount of the phosphate salt compound and the phenolic antioxidant is not less than 95% by mass of the granulated resin additive composition;
wherein the fatty acid calcium salt is 2 to 5 parts by mass with respect to 100 parts by mass of said granulated resin additive composition;
wherein the granulated resin additive composition consists essentially of, with respect to 100 parts by mass thereof, 20 to 80 parts by mass of said phosphate salt compound represented by said Formula (I) and 20 to 80 parts by mass of said phenolic antioxidant; and
wherein the fatty acid calcium salt is calcium stearate.

2. The granulated resin additive composition according to claim 1, which is for a polyolefin-based resin.

3. The granulated resin additive composition according to claim 1, which consists essentially of, with respect to 100 parts by mass thereof, 20 to 40 parts by mass of said phosphate salt compound represented by said Formula (I) and 55 to 80 parts by mass of said phenolic antioxidant.

4. A method of adding a resin additive composition to a resin, wherein a resin additive composition which consists essentially of a phosphate salt compound represented by the Formula (Compound No. 1):

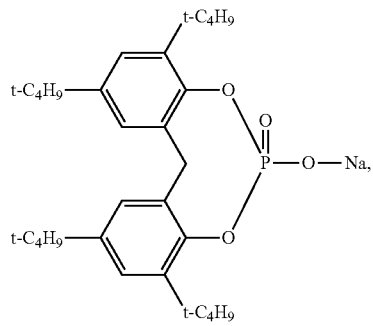

(Compound No. 1)

a phenolic antioxidant,
wherein the phenolic antioxidant is tetrakis {3(3,5-di-tert-butyl-4-hydroxyphenyl)propionyloxymethyl }methane,
and a fatty acid calcium salt
is made into granules containing 2 to 5 parts by mass of said fatty acid calcium salt with respect to 100 parts by mass of said resin additive composition and then added to a resin;
wherein the total amount of the phosphate salt compound and the phenolic antioxidant is not less than 95% by mass of the resulting granules;

wherein the resin additive composition consists essentially of, with respect to 100 parts by mass thereof, 20 to 80 parts by mass of said phosphate salt compound represented by said Formula (I) and 20 to 80 parts by mass of said phenolic antioxidant; and wherein the fatty acid calcium salt is calcium stearate.

5. The method according to claim 4, wherein the resin additive composition consists essentially of, with respect to 100 parts by mass thereof, 20 to 40 parts by mass of said phosphate salt compound represented by said Formula (I) and 55 to 80 parts by mass of said phenolic antioxidant.

* * * * *